US008594153B2

(12) United States Patent
McDermott

(10) Patent No.: US 8,594,153 B2
(45) Date of Patent: Nov. 26, 2013

(54) SPREAD-SPECTRUM RECEIVER WITH PROGRESSIVE FOURIER TRANSFORM

(75) Inventor: Scott A. McDermott, Washington, DC (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 1727 days.

(21) Appl. No.: 11/739,377

(22) Filed: Apr. 24, 2007

(65) Prior Publication Data

US 2012/0069870 A1 Mar. 22, 2012

Related U.S. Application Data

(60) Division of application No. 10/208,882, filed on Jul. 31, 2002, now Pat. No. 7,227,884, which is a continuation-in-part of application No. 09/513,962, filed on Feb. 28, 2000, now Pat. No. 6,985,512.

(51) Int. Cl.
*H04B 1/69* (2011.01)
*H04B 1/707* (2011.01)
*H04B 1/713* (2011.01)

(52) U.S. Cl.
USPC ........... 375/146; 375/147; 375/141; 375/142; 375/143; 375/150; 370/342; 370/320; 370/335; 370/441

(58) Field of Classification Search
USPC .......... 375/140–153, 343; 370/342, 320, 335, 370/441
See application file for complete search history.

(56) References Cited

U.S. PATENT DOCUMENTS 4,486,739 A 12/1984 Franaszek et al.
4,649,396 A 3/1987 Friedman
(Continued)

FOREIGN PATENT DOCUMENTS

DE 102004016548 A1 10/2005
EP 1406207 A1 4/2004

OTHER PUBLICATIONS

DVB User Guidelines for the Second Generation System for Broadcasting, Interactive Services, News Gathering and Other Broadband Satellite Applications (DVB-S2), ETSI TR 102 376 v.1.1.1 Technical Report, 2005, 104 pgs.

(Continued)

*Primary Examiner* — Phuong Phu
(74) *Attorney, Agent, or Firm* — Morgan, Lewis & Bockius LLP

(57) ABSTRACT

A receiving system dynamically searches the communications band for transmissions of messages having the same nominal communications parameters, including the use of the same spreading code, but having potentially different specific frequencies and code-phases. The receiver, which is independent of the transmitters, samples the communications band at each code-phase of the spreading code over a span of down-converted transmission frequencies. When a message element is detected at a particular code-phase and frequency, it is forwarded to a demodulator that demodulates the message and sends it to its intended destination. In a preferred embodiment, a progressive Fourier Transform is used to incrementally determine the power level at each successive code-phase at a given frequency, thereby substantially reducing the time required to search for transmissions at each discrete code-phase.

15 Claims, 4 Drawing Sheets

(56) References Cited

U.S. PATENT DOCUMENTS

| | | |
|---|---|---|
| 4,876,737 A | 10/1989 | Woodworth et al. |
| 4,901,307 A | 2/1990 | Gilhousen et al. |
| 5,109,390 A | 4/1992 | Gilhousen et al. |
| 5,309,474 A | 5/1994 | Gilhousen et al. |
| 5,376,778 A | 12/1994 | Kreft |
| 5,490,165 A | 2/1996 | Blakeney, II et al. |
| 5,537,397 A | 7/1996 | Abramson |
| 5,559,790 A | 9/1996 | Yano et al. |
| 5,566,168 A | 10/1996 | Dent |
| 5,568,472 A | 10/1996 | Umeda et al. |
| 5,570,350 A | 10/1996 | Myer et al. |
| 5,612,949 A | 3/1997 | Bennett |
| 5,625,629 A | 4/1997 | Wenk |
| 5,640,166 A | 6/1997 | Siwiak |
| 5,668,556 A | 9/1997 | Rouffet et al. |
| 5,694,396 A | 12/1997 | Firouzbakht et al. |
| 5,697,050 A | 12/1997 | Wiedeman |
| 5,724,384 A | 3/1998 | Kim et al. |
| 5,758,260 A | 5/1998 | Wiedeman |
| 5,790,070 A | 8/1998 | Natarajan et al. |
| 5,796,777 A | 8/1998 | Terlep et al. |
| 5,815,071 A | 9/1998 | Doyle |
| 5,818,883 A | 10/1998 | Smith et al. |
| 5,835,069 A | 11/1998 | Skoog |
| 5,841,765 A | 11/1998 | Fielding et al. |
| 5,872,777 A | 2/1999 | Brailean et al. |
| 5,920,278 A | 7/1999 | Tyler et al. |
| 5,983,111 A | 11/1999 | Kim |
| 5,999,561 A | 12/1999 | Naden et al. |
| 6,052,561 A | 4/2000 | Rudowicz et al. |
| 6,084,919 A | 7/2000 | Kleider et al. |
| 6,088,413 A | 7/2000 | Autry et al. |
| 6,100,806 A | 8/2000 | Gaukel |
| 6,121,922 A | 9/2000 | Mohan |
| 6,128,276 A | 10/2000 | Agee |
| 6,128,469 A | 10/2000 | Zenick et al. |
| 6,151,313 A | 11/2000 | Abramson |
| 6,163,681 A | 12/2000 | Wright et al. |
| 6,185,245 B1 | 2/2001 | Kim |
| 6,188,682 B1 | 2/2001 | Takagi et al. |
| 6,205,167 B1 | 3/2001 | Kamgar et al. |
| 6,226,531 B1 | 5/2001 | Holt et al. |
| 6,301,316 B1 | 10/2001 | Uchida et al. |
| 6,307,840 B1 | 10/2001 | Wheatley, III et al. |
| 6,317,029 B1 | 11/2001 | Fleeter |
| 6,339,611 B1 | 1/2002 | Antonio et al. |
| 6,349,110 B1 | 2/2002 | Davidovici et al. |
| 6,353,730 B1 | 3/2002 | Buettner et al. |
| D455,641 S | 4/2002 | Trifilio |
| 6,373,831 B1 | 4/2002 | Secord et al. |
| 6,396,819 B1 | 5/2002 | Fleeter et al. |
| 6,421,373 B1 * | 7/2002 | Saito .................. 375/148 |
| 6,438,118 B1 | 8/2002 | Matui |
| 6,507,602 B1 | 1/2003 | Dent |
| 6,510,172 B1 | 1/2003 | Miller |
| 6,529,488 B1 | 3/2003 | Urs et al. |
| 6,549,559 B2 | 4/2003 | Kamgar et al. |
| 6,574,205 B1 | 6/2003 | Sato |
| 6,628,699 B2 | 9/2003 | Ramberg et al. |
| 6,639,906 B1 | 10/2003 | Levin |
| 6,683,605 B1 | 1/2004 | Bi et al. |
| 6,720,801 B2 | 4/2004 | Houlberg |
| 6,728,298 B1 | 4/2004 | Okubo et al. |
| 6,754,190 B2 | 6/2004 | Gurney et al. |
| 6,763,056 B1 | 7/2004 | Ohsuge |
| 6,768,729 B1 | 7/2004 | Ohsuge |
| 6,799,094 B1 | 9/2004 | Vaida et al. |
| 6,826,169 B1 | 11/2004 | Nagatani et al. |
| 6,876,645 B1 | 4/2005 | Guey et al. |
| 6,894,995 B2 | 5/2005 | Chitrapu et al. |
| 6,944,149 B1 | 9/2005 | Kim et al. |
| 6,985,512 B1 * | 1/2006 | McDermott et al. .......... 375/147 |
| 7,006,032 B2 | 2/2006 | King et al. |
| 7,053,767 B2 | 5/2006 | Petite et al. |
| 7,110,435 B1 | 9/2006 | Sorrells et al. |
| 7,131,136 B2 | 10/2006 | Monroe |
| 7,203,630 B2 | 4/2007 | Kolb et al. |
| 7,227,884 B2 * | 6/2007 | McDermott .................. 375/147 |
| 7,236,778 B2 | 6/2007 | Schreiber |
| D554,474 S | 11/2007 | Miller |
| D574,221 S | 8/2008 | Allen |
| 7,430,257 B1 | 9/2008 | Shattil |
| 7,433,391 B2 | 10/2008 | Stafford et al. |
| D582,918 S | 12/2008 | Scott |
| 7,592,953 B2 | 9/2009 | Morana |
| 7,706,748 B2 | 4/2010 | Dutta |
| 7,848,458 B2 | 12/2010 | Ochiai et al. |
| 7,876,259 B2 | 1/2011 | Schuchman |
| 8,054,866 B2 | 11/2011 | Sasaoka et al. |
| 2002/0024965 A1 | 2/2002 | Lee |
| 2002/0067759 A1 | 6/2002 | Ertel et al. |
| 2002/0089434 A1 | 7/2002 | Ghazarian |
| 2002/0097690 A1 | 7/2002 | Fleeter et al. |
| 2002/0173888 A1 | 11/2002 | Shelton et al. |
| 2002/0177476 A1 | 11/2002 | Chou |
| 2002/0191632 A1 | 12/2002 | McDermott |
| 2003/0053521 A1 | 3/2003 | Huang et al. |
| 2003/0063576 A1 | 4/2003 | DiFazio |
| 2003/0123384 A1 | 7/2003 | Agee |
| 2003/0161428 A1 | 8/2003 | Garrett et al. |
| 2003/0202485 A1 | 10/2003 | Mansfield |
| 2003/0204378 A1 | 10/2003 | Cai |
| 2003/0235148 A1 | 12/2003 | Yang |
| 2004/0001534 A1 | 1/2004 | Yang |
| 2004/0008253 A1 | 1/2004 | Monroe |
| 2004/0029579 A1 | 2/2004 | Kashiwase |
| 2004/0029615 A1 | 2/2004 | Gerry et al. |
| 2004/0117611 A1 | 6/2004 | Huber et al. |
| 2004/0121729 A1 | 6/2004 | Herndon et al. |
| 2004/0183673 A1 | 9/2004 | Nageli |
| 2004/0246104 A1 | 12/2004 | Baechtiger et al. |
| 2005/0038601 A1 | 2/2005 | Dentinger et al. |
| 2005/0041573 A1 | 2/2005 | Eom et al. |
| 2005/0060339 A1 | 3/2005 | McGee |
| 2005/0076034 A1 | 4/2005 | Addonisio et al. |
| 2005/0143005 A1 | 6/2005 | Moore, III |
| 2005/0175123 A1 | 8/2005 | Gurney et al. |
| 2005/0176436 A1 | 8/2005 | Mantravadi et al. |
| 2005/0201311 A1 | 9/2005 | Willey et al. |
| 2005/0201326 A1 | 9/2005 | Lakkis |
| 2005/0248456 A1 | 11/2005 | Britton, Jr. et al. |
| 2005/0281319 A1 | 12/2005 | Schilling |
| 2006/0055561 A1 | 3/2006 | Kamali et al. |
| 2006/0094450 A1 | 5/2006 | Park et al. |
| 2006/0140314 A1 | 6/2006 | Kim et al. |
| 2006/0141930 A1 | 6/2006 | Keen et al. |
| 2006/0187026 A1 | 8/2006 | Kochis |
| 2006/0233147 A1 | 10/2006 | Karabinis |
| 2006/0251107 A1 | 11/2006 | Geren et al. |
| 2007/0031150 A1 | 2/2007 | Fisher et al. |
| 2007/0040647 A1 | 2/2007 | Saenz et al. |
| 2007/0064641 A1 | 3/2007 | Laroia et al. |
| 2007/0086335 A1 | 4/2007 | McCanne et al. |
| 2007/0116158 A1 | 5/2007 | Guo et al. |
| 2007/0117515 A1 | 5/2007 | Sinibaldi et al. |
| 2007/0130599 A1 | 6/2007 | Monroe |
| 2007/0202816 A1 | 8/2007 | Zheng |
| 2007/0223425 A1 | 9/2007 | Masui et al. |
| 2007/0291826 A1 | 12/2007 | Hafuka |
| 2007/0293149 A1 | 12/2007 | Wubker |
| 2007/0298786 A1 | 12/2007 | Meyers et al. |
| 2008/0030345 A1 | 2/2008 | Austin et al. |
| 2008/0043653 A1 | 2/2008 | Lakkis |
| 2008/0181170 A1 | 7/2008 | Branlund et al. |
| 2009/0042516 A1 | 2/2009 | Karabinis |
| 2009/0046771 A1 | 2/2009 | Abe et al. |
| 2009/0135954 A1 | 5/2009 | Salhov et al. |
| 2009/0175299 A1 | 7/2009 | Hosokawa et al. |
| 2009/0238246 A1 | 9/2009 | Dawid et al. |
| 2009/0257517 A1 | 10/2009 | Nordstrom et al. |
| 2009/0279620 A1 | 11/2009 | Schenk |
| 2009/0298422 A1 | 12/2009 | Conroy et al. |
| 2009/0316759 A1 | 12/2009 | Zeira |
| 2010/0064091 A1 | 3/2010 | Futenma et al. |

(56) References Cited

U.S. PATENT DOCUMENTS

| | | |
|---|---|---|
| 2010/0166180 A1 | 7/2010 | Steer et al. |
| 2010/0322334 A1 | 12/2010 | Wang et al. |
| 2011/0038261 A1 | 2/2011 | Carlstrom |

OTHER PUBLICATIONS

HT PHY Specification, Enhanced Wireless Consortium publication V1.27, Dec. 23, 2005, 67 pgs.
McDermott, Office Action, U.S. Appl. No. 12/890,578, Oct. 26, 2012, 14 pgs.
Morana, Notice of Allowance, U.S. Appl. No. 12/585,056, Nov. 20, 2012, 5 pgs.
Singleton, Office Action, U.S. Appl. No. 11/693,116, Oct. 26, 2012, 9 pgs.
Candell, Office Action, U.S. Appl. No. 12/692,789, Mar. 30, 2012, 8 pgs.
Candell, Notice of Allowance, U.S. Appl. No. 12/692,789, May 10, 2013, 6 pgs.
Fleeter, Notice of Allowance, U.S. Appl. No. 13/422,195, Apr. 23, 2013, 9 pgs.
Fleeter, Office Action, U.S. Appl. No. 13/422,173, May 20, 2013, 21 pgs.
Fleeter, Office Action, U.S. Appl. No. 13/422,195, Dec. 6, 2012, 17 pgs.
McDermott, Final Office Action, U.S. Appl. No. 12/890,578, May 16, 2013, 19 pgs.
Morana, Office Action, U.S. Appl. No. 12/585,056, Apr. 24, 2013, 3 pgs.
Fleeter, Office Action, U.S. Appl. No. 13/422,173, Jun. 8, 2012, 16, pgs.
Fleeter, Office Action, U.S. Appl. No. 13/422,195, Jul. 16, 2012, 23 pgs.
Morana, Office Action, U.S. Appl. No. 12/585,056, Apr. 19, 2012, 5 pgs.
Smith, Notice of Allowance, U.S. Appl. No. 12/396,447, Jun. 5, 2012, 7 pgs.
Candell, Office Action, U.S. Appl. No. 12/692,789, Sep. 21, 2012, 10 pgs.
Fleeter, Office Action, U.S. Appl. No. 10/992,173, Oct. 17, 2012, 17 pgs.
Berthet, Synchronization Complexity for a Satellite Multimedia Burst Receiver, NORSIG99, Sep. 9-11, 1999, Asker, Norway, 5 pgs.
Evans, Satellite Communication Systems 3rd edition, Jan. 2009, cover page and p. 468.
Fleeter, Final Office Action, U.S. Appl. No. 10/992,173, Oct. 12, 2011, 15 pgs.
Fleeter, Notice of Allowance and Fees Due, U.S. Appl. No. 10/054,175, Aug. 18, 2004, 7 pgs.
Fleeter, Office Action, U.S. Appl. No. 09/130,854, Nov. 22, 2000, 7 pgs.
Fleeter, Office Action, U.S. Appl. No. 10/992,173, Apr. 8, 2011, 14 pgs.
Franke, Choosing the best hardware form-factor for the airborne domain of the Joint Tactical Terminal (JTT) and Joint Tactical Radio System (JTRS), Aug. 6, 2002, 8 pgs.
Handermann, Notice of Allowance and Fees Due, U.S. Appl. No. 11/685,936, Dec. 1, 2009, 6 pgs.
Handermann, Office Action, U.S. Appl. No. 11/685,936, Sep. 9, 2009, 22 pgs.
Handermann, Office Action, U.S. Appl. No. 11/685,936, Oct. 20, 2008, 16 pgs.
Handermann, Supplemental Notice of Allowability, U.S. Appl. No. 11/685,936, Dec. 15, 2009, 4 pgs.
Harms, The Orbcomm Experience, EMPS 2004, Sep. 2004, 6 pgs.
Holm, Why convert to a SAASM-based Global Positioning System?, Military Embedded Systems, Oct. 2005, 3 pgs.
International Search Report and Written Opinion, PCT/US2006/042524, Apr. 22, 2008, 13 pgs.
International Search Report and Written Opinion, PCT/US2006/049656, Feb. 21, 2008, 12 pgs.
International Search Report and Written Opinion, PCT/US2007/063986, Oct. 26, 2007, 12 pgs.
Jordan, Final Office Action, U.S. Appl. No. 11/936,784, Nov. 7, 2011, 16 pgs.
Jordan, Office Action, U.S. Appl. No. 11/936,784, Aug. 27, 2010, 12 pgs.
Larson, Mission Analysis and Design, Chapter 22-Design of Low-Cost Spacecraft, 1992, 2 cover sheets and pp. 767-796.
McDermott, Final Office Action, U.S. Appl. No. 09/513,962, Apr. 16, 2004, 10 pgs.
McDermott, Final Office Action, U.S. Appl. No. 09/513,962, May 27, 2005, 9 pgs.
McDermott, Notice of Allowance and Fees Due, U.S. Appl. No. 09/513,962, Sep. 9, 2005, 4 pgs.
McDermott, Notice of Allowance and Fees Due, U.S. Appl. No. 10/208,882, Apr. 10, 2007, 8 pgs.
McDermott, Notice of Allowance and Fees Due, U.S. Appl. No. 11/876,747, Jun. 3, 2009, 7 pgs.
McDermott, Office Action, U.S. Appl. No. 09/513,962, Sep. 14, 2004, 6 pgs.
McDermott, Office Action, U.S. Appl. No. 09/513,962, Jun. 24, 2003, 10 pgs.
McDermott, Office Action, U.S. Appl. No. 10/208,882, Jan. 3, 2007, 11 pgs.
McDermott, Office Action, U.S. Appl. No. 11/876,747, Nov. 28, 2008, 5 pgs.
McDermott, Specification and Drawings, U.S. Appl. No. 11/876,747, Oct. 22, 2007, 28 pgs.
Meyers, Notice of Allowance and Fees Due, U.S. Appl. No. 11/592,008, Aug. 26, 2010, 10 pgs.
Meyers, Office Action, U.S. Appl. No. 11/592,008, Feb. 3, 2010, 24 pgs.
Meyers, Office Action, U.S. Appl. No. 11/592,008, Aug. 15, 2008, 18 pgs.
Meyers, Office Action, U.S. Appl. No. 11/592,008, May 18, 2010, 25 pgs.
Meyers, Office Action, U.S. Appl. No. 11/592,008, Mar. 19, 2009, 25 pgs.
Meyers, Office Action, U.S. Appl. No. 11/592,008, Sep. 21, 2009, 24 pgs.
Morana, Notice of Allowance and Fees Due, U.S. Appl. No. 11/618,379, May 13, 2009, 4 pgs.
Morana, Office Action, U.S. Appl. No. 11/618,379, Jan. 6, 2009, 7 pgs.
Morana, Office Action, U.S. Appl. No. 12/585,056, Oct. 13, 2011, 8 pgs.
Morana, Office Action, U.S. Appl. No. 29/270,057, Feb. 26, 2009, 5 pgs.
Ormesher, Current Radar Responsive Tag Development Activities at Sandia National Laboratories, Proc. of SPIE vol. 5410, 2004, 7 pgs.
Skiscim, Notice of Allowance and Fees Due, U.S. Appl. No. 12/101,391, Jul. 22, 2011, 18 pgs.
Skiscim, Office Action, U.S. Appl. No. 12/101,391, Jan. 4, 2011, 14 pgs.
Smith, Office Action, U.S. Appl. No. 12/396,447, Dec. 5, 2011, 31 pgs.
Stafford, Final Office Action, U.S. Appl. No. 11/681,759, May 20, 2008, 8 pgs.
Stafford, Notice of Allowance and Fees Due, U.S. Appl. No. 11/681,759, Aug. 13, 2008, 7 pgs.
Stafford, Notice of Allowance and Fees Due, U.S. Appl. No. 11/937,826, Jul. 29, 2011, 8 pgs.
Stafford, Office Action, U.S. Appl. No. 11/681,759, Dec. 21, 2007, 7 pgs.

(56) References Cited

OTHER PUBLICATIONS

Stafford, Office Action, U.S. Appl. No. 11/937,826, Sep. 16, 2010, 5 pgs.
Summers, Plug and play testbed to enable responsive space missions, IEEE paper #1221, Mar. 5-12, 2005, 8 pgs.
Zenick Jr., Notice of Allowance and Issue Fee Due, U.S. Appl. No. 09/045,970, Sep. 24, 2001, 2 pgs.
Zenick Jr., Office Action, U.S. Appl. No. 09/045,970, Apr. 10, 2001, 4 pgs.
Zenick Jr., Office Action, U.S. Appl. No. 09/045,970, Oct. 25, 2001, 3 pgs.

* cited by examiner

FIG. 1 [Prior Art]

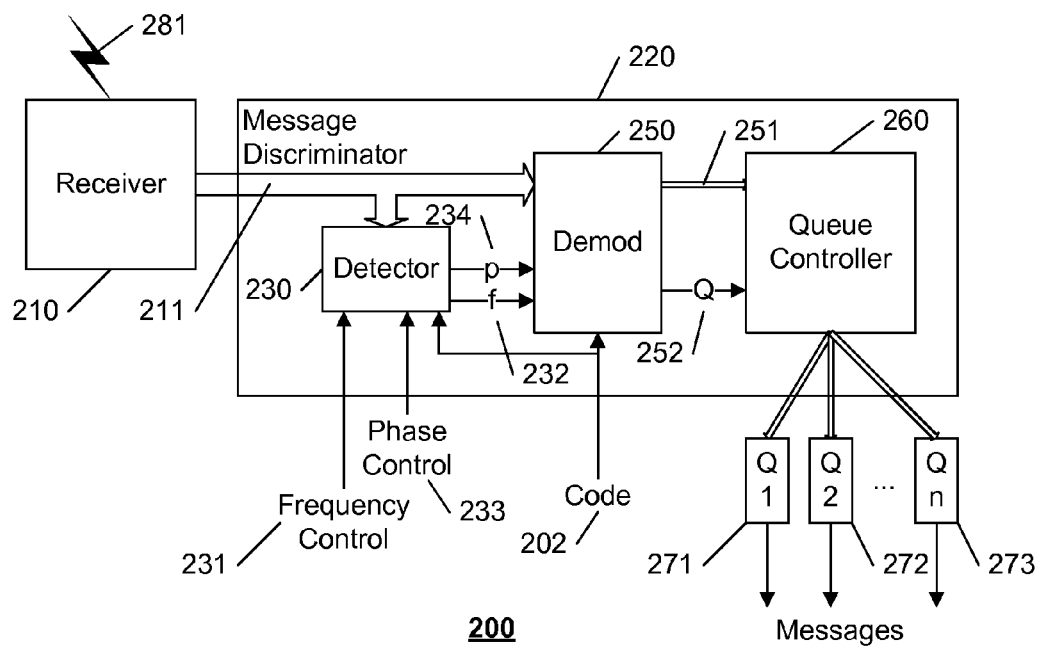
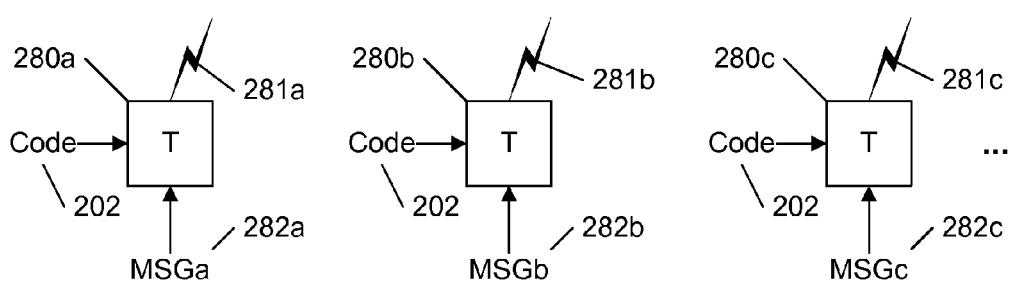
FIG. 2

SPREAD-SPECTRUM RECEIVER WITH PROGRESSIVE FOURIER TRANSFORM

This is a divisional application of U.S. patent application Ser. No. 10/208,882, filed 31 Jul. 2002, which is a continuation-in-part of U.S. patent application Ser. No. 09/513,962, filed 28 Feb. 2000, which is incorporated by reference herein.

BACKGROUND OF THE INVENTION

1. Field of the Invention

This invention relates to the field of communications, and in particular to the processing of multiple asynchronous spread-spectrum communications.

2. Description of Related Art

Spread-Spectrum techniques are used to modulate an information signal such that the modulated signal appears as noise. The information is modulated by a pseudo-random signal, and can be demodulated, or despread, by the same pseudo-random sequence. This modulation is commonly referred to as Direct-Sequence Spread Spectrum (DSSS). The modulated signal is spread across a bandwidth that is substantially larger than the bandwidth of the information signal, and has the apparent effect of increasing the noise-floor of receivers that receive this signal. Applying the same pseudo-random sequence to the modulated signal allows the information signal to be detected within this apparent noise.

Code Division Multiple Access (CDMA) is a commonly used spread-spectrum communications technique wherein the information signal is encoded by one of many code sequences before it is transmitted. The received signal is decoded by the same code sequence to reproduce the original information signal. Transmissions from multiple transmitters can be simultaneously communicated via a common frequency channel by employing different code sequences for each transmitter, provided that the code sequences have particular uniqueness characteristics. The uniqueness characteristics of acceptable codes substantially guarantee that a coherent output will only be produced when the received signal corresponds to a signal that is encoded using the same code sequence. Signals that are not encoded using the same code sequence as the decoding code sequence are decoded as noise signals. In a conventional CDMA system, such as a cellular telephone network, the network controller allocates and deallocates code sequences on demand, so that each of the transmitters can transmit over the same network without interference from other transmitters.

An often overlooked characteristic of a pseudo-random spread spectrum code is that a coherent output is only produced when the decoding code sequence is applied substantially in phase with the encoding code sequence. Consider, for example, a six-bit code sequence 0-1-1-0-1-0. A one-bit phase shift of this sequence is 1-1-0-1-0-0 (cyclic shift to the left); a two-bit phase shift is 1-0-1-0-0-1; and so on. A six-bit code has six different "code-phases". If the received signal is decoded with a code-phase that corresponds to an encoding phase shifted by two bits, for example, this would be equivalent to receiving a signal having a 1-0-1-0-0-1 encoding sequence and decoding it with a 0-1-1-0-1-0 sequence. If this six-bit code is a proper pseudo-noise code, having the above defined uniqueness characteristics, then the decoding of this signal having a "different" encoding code merely produces a noise output. U.S. Pat. No. 5,537,397, "SPREAD ALOHA CDMA DATA COMMUNICATIONS", issued Jul. 16, 1996, to Norman Abramson, and incorporated by reference herein, discloses a technique that uses this phase-dependency characteristic to allow multiple transmitters to use the same code concurrently. As in the conventional CDMA system, the network controller provides an allocation to each transmitter, but in the referenced patent, each transmitter is allocated a different time-slot, or code-phase, rather than a different code. The controller instructs each transmitter to advance or delay its transmission, so that its signal is received at the receiver with a code-phase that is sufficiently different from the code-phase of other transmitters. In this manner, although each of the transmitters and the receiver use the same code, each transmitter provides a "different" (phase-shifted) code to the receiver, relative to the particular code-phase of the decoder at the time of decoding.

The prior art pseudo-random spread spectrum approaches require a unique identification of each transmitter, because the communication of each allocated code or code-phase must be directed to the appropriate transmitter. Each transmitter must also be equipped with a receiver, to receive and process the communicated code or phase allocation. The code-phase allocation technique also requires that each transmitter have identical encoding frequencies with the receiver, because a difference in frequency between a transmitter and receiver exhibits itself as a continually changing phase shift. As discussed further below, this requirement for substantially identical frequencies extends to the modulation frequency used to up-convert and down-convert to and from a communication radio frequency (RF). This equivalence in frequency can be achieved via the use of a phase locked loop that adjusts the receiver's frequency to the transmitter's. As would be evident to one of ordinary skill in the art, this approach requires a separate phase locked loop for each currently active transmitter.

U.S. Pat. No. 6,128,469, "SATELLITE COMMUNICATION SYSTEM WITH A SWEEPING HIGH-GAIN ANTENNA", issued 3 Oct. 2000 to Ray Zenick, John Hanson, Scott McDermott, and Richard Fleeter, and U.S. Pat. No. 6,396,819, "LOW-COST SATELLITE COMMUNICATION SYSTEM", issued 28 May 2002 to Richard Fleeter, John Hanson, Scott McDermott, and Ray Zenick, and U.S. Pat. No. 6,317,029, "IN-SITU REMOTE SENSING" issued 13 Nov. 2001 to Richard Fleeter, disclose systems and methods that facilitate the reception and processing of messages from a large number of preferably low-cost transmitters, and are each incorporated by reference herein. For example, a large number of IC chip-size transmitters may be released from an aircraft that overflies a hurricane or forest fire. These transmitters may be configured to periodically or randomly transmit their location and the atmospheric conditions at their location, such as temperature, pressure, moisture content, and so on. A receiving system receives and processes the transmissions from these many devices and provides temperature and pressure profiles, changes and trends, predictions, and the like. Such systems require simple, low-cost, and efficient transmitters.

BRIEF SUMMARY OF THE INVENTION

It is an object of this invention to provide a receiving system that is configured to distinguish among transmissions from a plurality of transmitters that are each communicating at a common frequency and using a common DSSS code sequence. It is a further object of this invention to provide a receiving system that distinguishes among these transmissions as the frequency and transmission rates vary among the plurality of transmitters.

These objects and others are achieved by providing a receiving system that dynamically searches the communications band for transmissions of messages having the same nominal communications parameters, including the use of the same spreading code, but having potentially different specific frequencies and code-phases. The receiver, which is independent of the transmitters, samples the communications band at each code-phase of the spreading code over a span of down-converted transmission frequencies. When a message element is detected at a particular code-phase and frequency, it is forwarded to a demodulator that demodulates the message and sends it to its intended destination. In a preferred embodiment of this invention, a progressive Fourier Transform is used to incrementally determine the power level at each successive code-phase at a given frequency, thereby substantially reducing the time required to search for transmissions at each discrete code-phase. To accommodate variances in frequency and/or phase of a received signal from the same transmitter, the received signal is partitioned into subsets, and a composite measure is used to detect subsets that 'slip' into an adjacent frequency or phase sampling bin.

BRIEF DESCRIPTION OF THE DRAWINGS

The invention is explained in further detail, and by way of example, with reference to the accompanying drawings wherein:

FIG. 2 illustrates an example block diagram for a communications system in accordance with this invention.

Throughout the drawings, the same reference numerals indicate similar or corresponding features or functions.

DETAILED DESCRIPTION OF THE INVENTION

Figure 1:
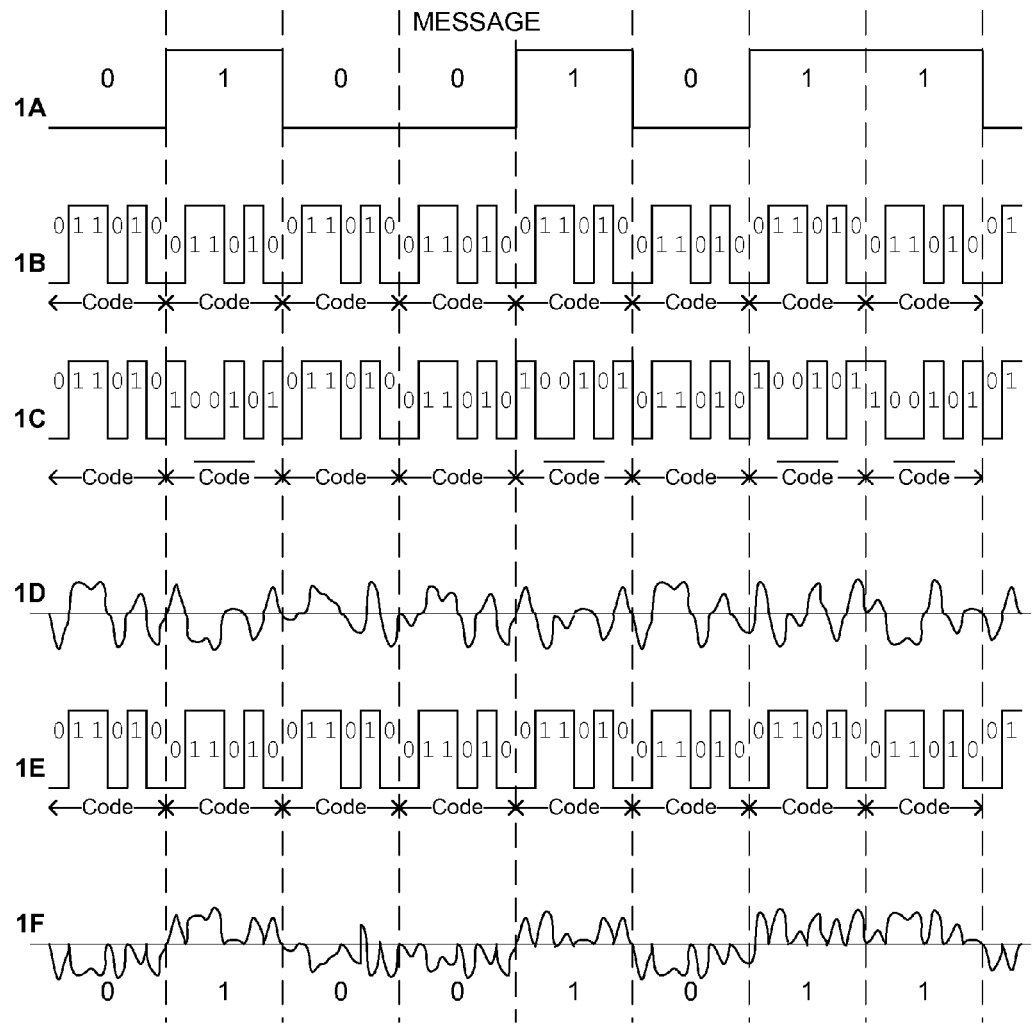
FIG. 1 illustrates an example timing diagram for an encoding and decoding process using an example six-bit spreading-code.

FIG. 1 illustrates an example timing diagram for an encoding and decoding process using an example spreading-code. Illustrated at 1A is a message sequence, consisting of an example 01001011 bit pattern. Illustrated at 1B is a code sequence, consisting of an example 011010 code pattern that is applied to each code-phase of the message. Although the example code comprises six bits, conventional codes use hundreds or thousands of bits. The timing diagram at 1C illustrates the combination of the example 011010 code being applied to each bit in the 01001011 message bit pattern. In this example, the encoding is an exclusive-or of the corresponding bits. That is, if the message bit is zero, the corresponding output is equal to the example code 011010; if the message bit is a one, the corresponding output is equal to the inverse of the code, 100101. As can be seen, this multiplexing of the message bits at 1A and the code at 1B results in a signal at 1C that changes up to six times more often than the original message. That is, the resultant signal is spread across a larger frequency range; as such, the code used to effect this increased frequency range is termed a "spreading code". The resultant higher frequency sequence illustrated at 1C is communicated to the receiving station, and subjected to noise and interference from other transmitters, and is received at the receiving station in a distorted form. Not illustrated, the sequence at 1C is typically modulated up to a higher frequency for transmission, then demodulated back, or down-converted, to the baseband frequency of the sequence at 1C. This received distorted baseband signal corresponding to the encoded message at 1C is illustrated at 1D.

At the receiver, the received signal at 1D is decoded by modulating it with the same code that was used to create the encoded signal, as illustrated at line 1E. As can be seen, decoding sequence at line 1E is identical, in value and phase, to the encoding sequence at line 1B. In this decoding, a logic value of zero in the code results in an output that is identical to the received signal, and a logic value of one in the code results in an output that is an inverse of the received signal. The decoded signal is illustrated at line 1F. As can be seen at line 1F, the regions of the decoded signal corresponding to a message bit value of "zero" have an overall signal level that is substantially lower than the regions of the decoded signal corresponding to the message bit value of "one". That is, each segment of the message bit that was inverted by a "one" in the encoding sequence (1B) is inverted again by a corresponding "one" in the decoding sequence (1E). A decoder that accumulates the energy content contained in each bit region would demonstrate a substantial negative value corresponding to each "zero" message bit, and a substantial positive value corresponding to each "one" message bit.

If the encoding sequence at 1B or the decoding sequence at 1E differ, either in value or in phase, the resultant signal at 1F will exhibit erroneous "positive" energy content segments in the regions corresponding to "zero" message bits, and erroneous "negative" energy content segments in the regions corresponding to "one" message bits. Because of this non-coherence, the energy content of each segment will tend to average out to zero, rather than exhibiting a strong "positive" or "negative" bias.

FIG. 2 illustrates an example block diagram of a communications system 200 in accordance with this invention. The communications system 200 includes a plurality of transmitters 280a-280c, a receiver 210, and a message discriminator 220. The transmitters 280a-c each provide a transmit signal 281a-c comprising a message 282a-c that is encoded using a spreading-code 202. Each transmitter 280a-c is substantially autonomous, and each transmitter 280a-c uses the same encoding and communications parameters, including the same spreading-code 202, and the same modulation technique to provide the transmit signal 281a-c over the same communications channel. These transmit signals 281a-c form a composite signal 281 within this common communications channel. If two or more transmitters 280a-c transmit at the same time and at the same code-phase and essentially the same frequency, a collision results and these transmissions will not be distinguishable within the composite signal 281. If only one transmitter 280a-c is transmitting at a given code-phase, the transmitted message 282a-c will be decodable at this code-phase, as discussed with regard to FIG. 1.

There are a number of applications that include the communication of relatively short and non-critical messages. Because a typical code 202 includes a sequence of over a thousand bits, thereby forming over a thousand code-phases for each bit of a message, the likelihood of two infrequently transmitting devices transmitting at exactly the same code-phase at the same time is slight. Because the messages are non-critical, the loss of individual messages because of this possibility of an exact phase coincidence is acceptable. For example, an application of U.S. Pat. No. 6,317,029, "IN-SITU REMOTE SENSING", referenced above, includes the sensing of moisture content over a vast geographic area. Collectively, this information is useful and significant, but the intermittent loss of reports from individual collectors would not be significant. Because the odds are in favor of subsequent or prior reports from these collectors being transmitted without collision, and the rate of change of information content from these collectors can be expected to be low, the loss of individual reports has an insignificant effect on the collective information.

Other applications that are particularly well suited for this invention include, for example, cargo or container tracking; intrusion or trespass detection; emergency beacons; pipeline monitors; utility consumption meters; and so on. An infrequently transmitting beacon on a cargo container, for example, will use very little power, and can be economically provided to allow tracking of even small containers. If some intermediate reports of the container's location are lost due to collisions with other transmission, the effect will be non-consequential. In like manner, if pressure-sensing transmitters are dispersed over an open area, pedestrian or vehicular traffic across this area can be readily detected, even if some of the transmissions from the transmitters are lost. Similarly, an emergency beacon need only be detected once to have a desired rescue effect. These and other applications will be evident to one of ordinary skill in the art in view of this disclosure.

In this example embodiment, the receiver 210 receives the composite signal 281, down-converts the composite signal 281 to a baseband signal 211, and provides the baseband signal 211 to the message discriminator 220. Within the message discriminator 220, a detector 230 determines each particular frequency 232 and code-phase 234 that contains substantial signal energy, as discussed further below, and provides these frequencies 232 and code-phases 234 to a demodulator 250. The demodulator 250 decodes the baseband signal 211 at each of these frequencies 232 and code-phase 234 to produce a decoded signal 251 corresponding to each frequency 232 and code-phase 234 pair. Each decoded signal 251 corresponds to segment of a particular transmitted message 282a-c. A queue controller 260 stores each decoded signal 251 from each frequency 232 and code-phase 234 pair into a corresponding queue 271-273, thereby forming strings of signals 251 in each queue 271-273 that correspond to the transmitted messages 282a-c.

Figure 3:
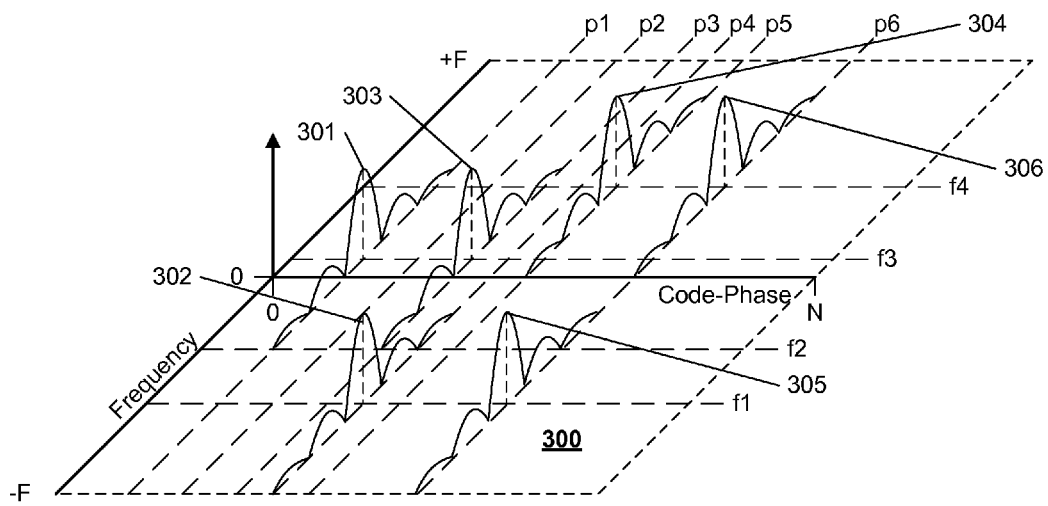
FIG. 3 illustrates an example plot of energy distribution within a decoded baseband composite signal as a function of frequency and code-phase in accordance with this invention.

FIG. 3 illustrates an example plot of energy levels within a decoded baseband composite signal 300 as a function of frequency and code-phase. That is, the example plot of FIG. 3 illustrates the energy that would be detected if a particular spreading code were applied to the baseband signal 211 of FIG. 2 within the frequency band of +/−F, at each of N code phases of an N-bit spreading code. As illustrated, the example decoded composite signal 300 includes energy distributions 301-306 from six transmitters that used the same spreading code.

Ideally, if the transmit frequencies of each transmitter were identical, and equal to the receiver frequency, each of the energy distributions 301-306 would lie along the f=0 axis. The variance among transmit and receive frequencies results in a distribution of energy distributions within the +/−F band, where F is defined as the maximum allowable difference between transmit and receive frequencies.

Although each transmitter is using the same spreading code, each transmitter operates asynchronously to the receiver, and thus the received energy distributions occur at different code-phases, relative to the receiver. As can be seen, each transmitter's energy distribution 301-306 can be identified as occurring at a particular (frequency, phase) pair, relative to the receiver. That is, energy distribution 301 occurs at frequency f3 and code phase p1 (f3, p1); energy distribution 302 occurs at (f1, p4); energy distribution 303 at (f3, p3); and so on. In accordance with this invention, individual transmissions are discriminated based on the energy content at each frequency and code-phase. Each coincidentally transmitted message that is sufficiently separated from other messages, in frequency or in code-phase, can be discriminated from the other messages using the techniques disclosed herein.

Referring back to FIG. 2, in accordance with this invention, the detector 230 scans the baseband signal 211 to detect substantial energy distributions within a given frequency-phase search space. The detector 230 applies the spreading code 202 at each frequency and phase combination, as controlled by the frequency 231 and phase 233 control signals, and reports each of the frequency-phase pairs f 232, p 234 ((f3, p1), (f1, p4), (f3, p3), and so on) at which substantial energy levels 301-306 are detected. The demodulator 250 demodulates the baseband signal 211 at the given frequency 232 and phase 234, and forward the demodulated signal 351 to the queue controller 360. The demodulator 250 associates each frequency-phase pair 232, 234 with a queue index Q 252, and the queue controller 260 routes each demodulated signal 251 to a corresponding queue 271-273, based on this index 252.

Although the detector 230 may be configured to contain multiple detection devices, to allow the detector 230 to scan and decode the baseband signal 211 in parallel, an embodiment of this invention that minimizes the cost of the detector 230 provides an efficient means for scanning and decoding the baseband signal 211 within a single process. Preferably, the efficiency of the detector 230 is such that it allows the detection process to be accomplished via software running on a general purpose processor, or on a signal processor, as well as via conventional hardware devices.

Figure 4:
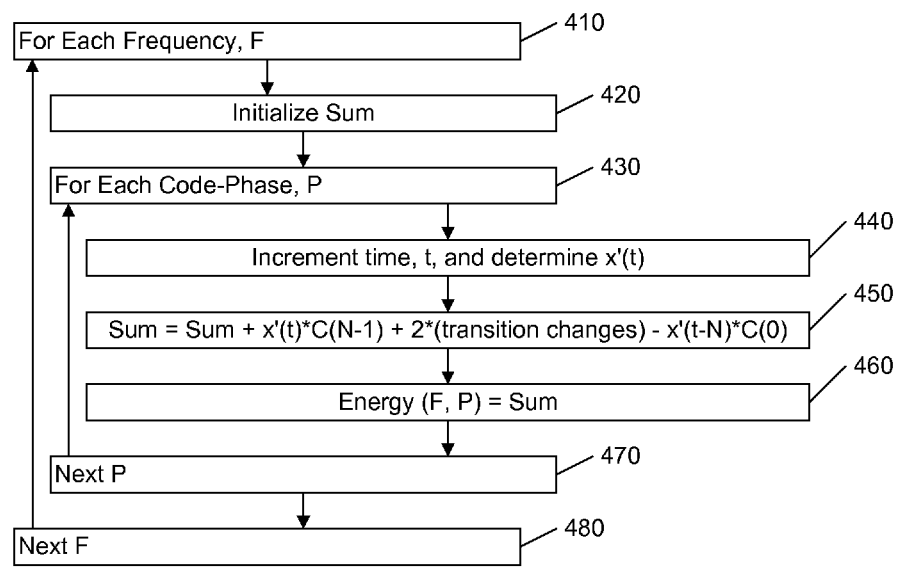
FIG. 4 illustrates an example flow diagram of a detection process in accordance with this invention.

FIG. 4 illustrates an example flow diagram of a detection process in accordance with this invention that is suitable for embodiment in a software program. The process searches the solution space for each combination of frequency and phase via the nested loops 410-480 (frequency) and 430-470 (phase). The frequency band of +/−F is partitioned into a number (M) of discrete frequencies, nominally spaced by a space d, where d=2*F/(M−1). Non-uniform spacing may also be used. The spacing d, and therefore the number M, is determined based on the filter characteristics of the detector, using techniques common in the art. The filter characteristics are selected such that the band-pass width of the filter is at least as wide as the main lobe of the transmission energy distribution (301-306 in FIG. 3) during the detection period, and d is selected such that an energy distribution that occurs at a center frequency that is half-way between two discrete frequencies is not substantially attenuated, thereby allowing it to be detected at either or both of the discrete frequencies. The loop 410-480 steps through each of these discrete frequencies, thereby scanning across the +/−F frequency band.

The loop 430-470 is configured to determine the energy content of the input stream at the particular discrete frequencies, at each of the N code-phases of the N-bit spreading code. In a straightforward embodiment of this invention, the N-bit spreading code would be applied to the last N-samples of the incoming signal to decode the signal at a current code-phase, and a DFT of the despread, or decoded, N-samples would be applied to determine the energy content at this code-phase for the given frequency. Then, time advances to the next code-phase, and a next sample of the incoming signal is received. The N-bit spreading code is applied to the new set of N-samples of the incoming signal (the newly received sample plus N−1 of the previous samples), and another DFT of the despread N-samples of incoming signal would be applied to determine the energy content of this next code-phase.

The DFT of a decoded N-bit input stream can be expressed as:

$$X_m(t) = \sum_{c=0}^{N-1} x(t-c)C(N-1-c)e^{-jf_m(t-c)}$$

where:

$X_m(t)$ is the discrete Fourier transform (DFT) output, $x(t)$ is the input sample at time t, $C(n)$ is the +/−1 spreading code at bit n, and $f_m$ is the frequency being searched.

This straightforward approach, however, requires N complex multiplications, and N complex sums per code phase. In accordance with a second aspect of this invention, a "Progressive", or incremental, Discrete Fourier Transform (PDFT) process is used to efficiently compute the DFT at each code-phase, as detailed below.

Figure 5:
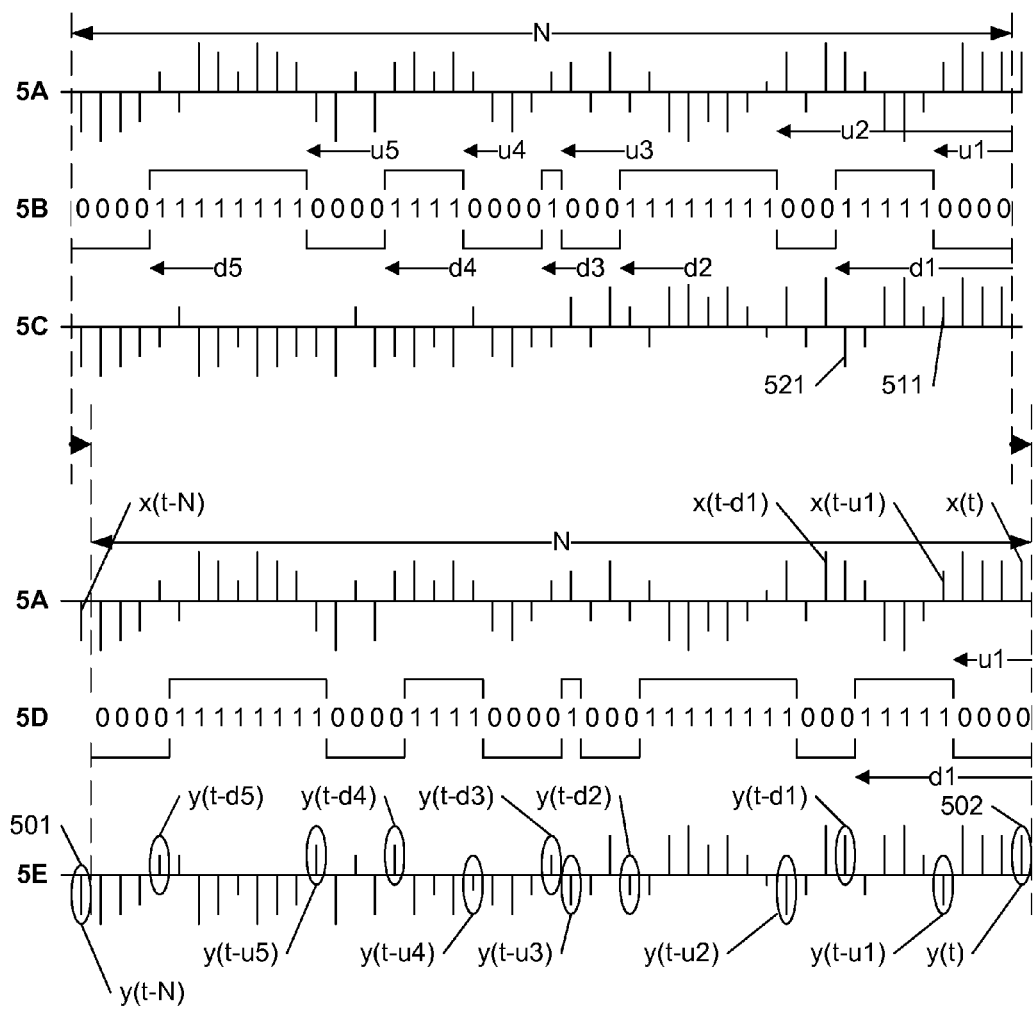
FIG. 5 illustrates an example timing diagram of two successive code phase decodings of an input stream in accordance with this invention.

Each code-phase corresponds to the decoding of the incoming signal via the given spreading code at successive increments of time. FIG. 5 illustrates an example timing diagram of two successive code phase decodings of an input stream. Line 5A illustrates an example input stream (and is repeated twice, as Lines 5A and 5A', for ease of reference). Line 5B illustrates an example spreading code, and Line 5C illustrates the application of the spreading code of line 5B to the input stream of line 5A. In this example, a "zero" value of the code corresponds to a multiplication of the input stream bit value by +1, and a "one" value of the code corresponds to a multiplication of the input stream bit value by −1.

Line 5D illustrates the code of line 5B at the next code-phase; that is, shifted by one bit. The application of the code at this code phase produces the decoded output that is illustrated on Line 5E. The circled values on Line 5E illustrate the decoded bit values that differ from the values of Line 5C. At the extremes 501, 502 of the code, the newest sample 502, at time t, is included in this next set of N decoded samples, and the oldest sample 501, at t−N, is not included. At each transition of the code, the decoded samples on Line 5E differ from the decoded samples of Line 5C. At all points other than the transition points of the code, the values on Lines 5E and 5C are identical. Thus, the decoded samples at each successive code phase can be expressed in terms of the decoded samples of the prior code phase, modified by the addition of the newest sample, subtraction of the oldest sample, and the inversion of sample values at each code transition point. For ease of reference, the code transitions are distinguished as "up" transitions and "down" transitions. The "up" transitions are illustrated as occurring at times u1, u2, u3, u4, and u5 at Line 5B, and the "down" transitions are illustrated as occurring at times d1, d2, d3, d4, and d5. As time is illustrated as progressing from left-to-right in FIG. 3, the transition times are illustrated from right-to-left from the most recent input sample. As illustrated on Line 5E, this convention allows the samples at the transitions to be referenced as y(t−u1), y(t−u2), ... y(t−d1), y(t−d2), and so on.

At an "up" transition, such as u1, the decoded output y(t−u1) of Line 5E corresponds to an inversion of the input sample x(t−u1) of Line 5A', whereas, on Line 5C, the corresponding decoded value 511 is a non-inversion of the input sample. Thus, each up-transition corresponds to a subtraction of the input sample, and an addition of the inversion of the input sample, for a total change of a double subtraction of the input sample x(t−u1) from the previous result. At a "down" transition, on the other hand, such as d1, the decoded output y(t−d1) on Line 5E corresponds to a non-inversion of the input sample x(t−d1), while on Line 5C, the corresponding decoded value 521 is an inversion of the input sample. Thus, each down-transition corresponds to the subtraction of an inversion of the input sample and the addition of the input sample, for a total change of a double addition of the input sample x(t−d1) to the previous result.

Based on the above, the progressive DFT of a next code phase can be expressed as:

$$X_m(t) = X_m(t-1) + x'(t)C(N-1) - x'(t-N)C(0) + 2*\sum_{i=1}^{\#downs} x'(t-d_i) - 2*\sum_{i=1}^{\#ups} x'(t-u_i) \quad (2)$$

where:

$x'(t)=x(t)e^{-jf_m t}$, the transform of input sample x(t) at the given frequency $f_m$, $X_m(t)$ is the DFT of the code phase at time t, $X_m(t-1)$ is the DFT of the prior code phase, at time t−1, $C(n)$ is the code at bit position n, $d_i$ are the down transitions of the code, and $u_i$ are the up transitions of the code.

The output of equation (2) is identical to equation (1), but equation (2) is expressed as a change to the DFT of the prior code phase. Assuming that the transforms x'(t) are saved for subsequent use, equation (2) only requires one complex multiplication (to determine the newest x'(t)), and fewer than N+2 complex additions, depending upon the number of transitions in the spreading code.

Returning to FIG. 4, at the commencement of the loop 410-480, a Sum term is initialized, at 420, to provide an initial value for the incremental determination of the Discrete Fourier Transform (DFT) corresponding to each code-phase. This initial value corresponds to the DFT of the baseband signal at a first code-phase at the particular frequency determined by the frequency loop 410-480, and can be determined via equation (1).

The loop 420-470 determines the DFT for each subsequent code-phase by modifying the Sum term based on the next transformed input sample x'(t), the oldest transformed input sample x'(t−N), and the transformed input samples at each transition, as detailed in equation (2). At 440, the next transformed input value x'(t) is determined, and at 450, the Sum term is modified. The Sum term corresponds to the energy content at the given frequency, F, and code-phase, P, and is stored as such, at 460.

As noted above, the incremental determination of the DFT at 450 for each code-phase is equivalent to a conventional determination of a DFT for each code-phase, and thus the flow diagram of FIG. 4 corresponds to a detection of the energy content at each frequency and code-phase pair within the given search space, and, because of the incremental nature of the computations, is particularly well suited for implementation as a software routine. Alternatively, a plurality of hardware devices could be employed, each tuned to one of the discrete frequencies within the +/−F frequency band, and each configured to continuously calculate the DFT at each code phase using the above described progressive, or incremental, DFT process. In such an embodiment, to optimize performance, the demodulator 250 of FIG. 2 would preferably be partitioned into a plurality of demodulators, and each hardware device would preferably contain both the detector 230 and one or more demodulators 250, integrated as a single unit.

Any of a variety of techniques can be applied to determine which frequency-phase pairs (f, p) are reported to from the detector 230 to the demodulator 250 of FIG. 2. In a straightforward embodiment, an energy threshold value may be used to identify the frequency-phase pairs contain sufficient energy to warrant subsequent demodulation. In an optimum-utilization embodiment, the capacity of the demodulator(s) 250 is limited, and the detector 230 provides as many (f, p) pairs as the demodulator can handle, sorted by energy content. That is, if the demodulator 250 can accommodate the demodulation of k signals, the detector 230 provides the k (f, p) pairs that have the highest energy content.

Note that the above-described determination of the energy content at a given frequency and phase corresponds to the energy content of a single duration of the spreading code, hereinafter termed an "epoch". In a preferred embodiment of this invention, a plurality of epochs are used to determine the frequency-phase pairs that correspond to a transmission that warrants demodulation. In a straightforward embodiment, the magnitudes of the energy content at each epoch are added together and compared to a threshold value.

In a preferred embodiment, because the DFT measure of energy content includes both a magnitude and phase, a vector sum is also used. Because vector sum has the effect of narrowing the input bandwidth, and therefore reduces the allowable spacing between discrete frequencies in the +/−F search band, a combination of vector sums and magnitude sums is used. A running vector sum of a fixed number of epochs is maintained, and the magnitudes of these running vector sums are summed to provide the sum that is used to determine the overall energy content at each frequency-phase pair.

Due to a variety of effects, such as the Doppler effect caused by relative motion between a transmitter and receiver, the epochs from a single transmitter may drift, or 'slip' from one frequency-phase pair to an adjacent frequency-phase pair. If such effects are expected to occur, the energy-determination schemes addressed above can be modified to form a composite magnitude, based on the energy contents of a plurality of adjacent frequency-phase pairs. If the drift is constant or predictable, techniques can be applied to optimize the determination of the composite, by only including adjacent frequency-phase pairs in a determined direction from the initial frequency-phase pair. For example, if it is known that frequency drifts are rare, the composite energy determination may be based only on the two frequency-phase pairs that are adjacent in phase to the initial frequency-phase pair, rather than the eight frequency-phase pairs that are adjacent in frequency, in phase, or both.

While the above embodiment employs a Discrete Fourier Transform (DFT), any means for calculating a Fourier Transform may be adjusted using the above techniques to make it progressive, or incremental. For example, a Fast Fourier Transform (FFT) very efficiently calculates a set of evenly spaced Fourier Transforms by retaining information on sub-calculations common to multiple transforms. By applying the above techniques to the first calculation column of an FFT "butterfly diagram", only a fraction of the nodes in this column need to be recalculated. That is, only those calculation nodes where one or both of its input points are "up" or "down" transitions as defined above, need to be recalculated. Similarly for the second column, only those calculation nodes where one or both of its input nodes (from the first column) have changed, need to be recalculated; and so on for the remaining columns in the FFT.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the techniques presented above use a Fourier Transform as the means for determining the energy content at a given frequency and code-phase, other techniques are common in the art for determining energy content, and may be used as well. In like manner, a DFT is used to determine the initial value of the Sum term in FIG. 4, which is a measure of the energy content at an initial code phase at a particular frequency. In an alternative embodiment, an FFT, or other energy-measuring means, can be used to initialize the Sum term, for subsequent modification using either the incremental DFT detailed in FIG. 4, or the above referenced incremental FFT. Additionally, although the equations provided are based on conventional formal techniques that are used to determine a measure of the energy content of a signal, other, less formal, techniques that approximate the energy content, or that adjust the measurement for compatibility with other system components, may also be used. For example, a technique that is commonly employed in iterative or incremental computations that modify a prior determined value is to scale the prior determined value by a factor that is less than unity, to prevent instabilities in the subsequent iterative calculations. Also, it is evident that the calculations performed by the detection portion of the preferred embodiment, may themselves be useful in executing the demodulation portion. For example, the outputs $X_m(t)$ for a given codephase p wherein a signal was detected—that is, $X_m(p)$, $X_m(p+N)$, $X_m(p+2N)$, and so on—may be used as despread, prefiltered inputs to the demodulation routine. These and other system configuration and optimization features will be evident to one of ordinary skill in the art in view of this disclosure, and are included within the scope of the following claims.

I claim:

1. A communications system comprising:
a plurality of reporting devices,
each reporting device including:
a data collection device that is configured to determine a state of one or more sensors, and
a transmitter that is configured to transmit the state of the one or more sensors about a nominal frequency that is common to the plurality of reporting devices using a spreading code that is common to the plurality of reporting devices;
wherein
a code-phase of the spreading code used at each transmitter is independent of the code-phase used at other transmitters of the plurality of devices,
actual transmission frequencies used by the transmitters of the plurality of reporting devices differ pseudo-randomly about the nominal frequency, and
each transmitter is configured to transmit the state of the one or more sensors at a rate and duration that are selected to, provide a low likelihood of collision with transmissions from the other transmitters, thereby facilitating discrimination of receptions of the state of the one or more sensors of the plurality of reporting devices at a receiving system that operates asynchronous to any of the transmitters, based on energy detected at each reception frequency and code-phase corresponding to each non-colliding transmission.

2. The communication system of claim 1, including
the receiving system, which is configured to distinguish the receptions by determining energy content at each of a plurality of reception frequencies and each of a plurality of code-phases.

3. The communication system of claim 2, wherein
the transmissions from the transmitters are configured to be received by a satellite system and relayed to the receiving system.

4. The communication system of claim 3, including the satellite system.

5. The communication system of claim 2, wherein
the receiving system is configured to report an alarm condition based on the state of the at least one sensor.

6. The communication system of claim 1, wherein
the reporting devices are configured to be attached to a cargo container, and at least one of the sensors is configured to provide information that facilitates determination of a location of the cargo container.

7. The communication system of claim 6, wherein
another of the sensors is configured to provide information that facilitates determination of intrusion into the cargo container.

8. The communication system of claim 1, wherein
the reporting devices are configured to be attached to an item of property, and at least one of the sensors is configured to provide information that facilitates determination of a location of the item.

9. The communication system of claim 1, wherein
the reporting devices are configured to be attached to a portal, and at least one of the sensors is configured to provide information that is indicative of trespass via the portal.

10. The communication system of claim 1, wherein
at least one of the sensors is configured to detect location parameters.

11. The communication system of claim 1, wherein
at least one of the sensors is configured to detect an amount of flow.

12. The communication system of claim 11, wherein
the flow corresponds to at least one of:
 a flow of electricity,
 a flow of liquid,
 a flow of gas,
 a flow of objects, and
 a flow of traffic.

13. The communication system of claim 1, wherein
at least one of the sensors is configured to detect pressure.

14. The communication system of claim 1, wherein
at least one of the sensors is configured to detect anomalous conditions.

15. The communication system of claim 1, wherein
the rate of transmission of the state is selected based on an intended use of the sensor, such that occurrences of collisions that prevent each state of the sensor from being determined at the receiving system are substantially inconsequential.

* * * * *